(12) United States Patent
Herwitz

(10) Patent No.: US 7,269,513 B2
(45) Date of Patent: Sep. 11, 2007

(54) GROUND-BASED SENSE-AND-AVOID DISPLAY SYSTEM (SAVDS) FOR UNMANNED AERIAL VEHICLES

(76) Inventor: Stanley R. Herwitz, 59 Puritan Rd., Newton, MA (US) 02461

( * ) Notice: Subject to any disclaimer, the term of this patent is extended or adjusted under 35 U.S.C. 154(b) by 171 days.

(21) Appl. No.: 11/120,263

(22) Filed: May 3, 2005

(65) Prior Publication Data

US 2006/0253254 A1 Nov. 9, 2006

(51) Int. Cl.
*G06F 17/10* (2006.01)
(52) U.S. Cl. .......................... 701/301; 701/3; 701/120; 701/206; 701/211; 340/435
(58) Field of Classification Search ............... 701/3, 701/120, 211, 215, 206, 207, 223, 200, 301; 340/901, 903, 425.5, 435, 426.19
See application file for complete search history.

(56) References Cited

U.S. PATENT DOCUMENTS 5,596,332 A * 1/1997 Coles et al. ................. 342/455

2003/0234730 A1* 12/2003 Arms et al. ............ 340/870.01
2007/0001051 A1* 1/2007 Rastegar et al. ............. 244/3.1

* cited by examiner

*Primary Examiner*—Gertrude A. Jeanglaude

(57) ABSTRACT

The present invention is a Sense-And-Avoid Display System (SAVDS) that integrates airborne target position data from a ground-based radar with unmanned aerial vehicle (UAV) position data from the UAV ground control station (GCS). The UAV GCS receives the UAV position data from a global positioning system (GPS) element in the flight management autopilot system in the UAV. Using a high-resolution display, the SAVDS shows the GPS position of the UAV in relation to other radar-detected airborne targets operating in the same airspace. With the SAVDS co-located adjacent to the GCS computer controlling the UAV, the SAVDS instructs the UAV operator to change the heading and/or elevation of the UAV until any potential midair aircraft conflict is abated. The radar-detected airborne target data and the UAV GPS data are integrated and displayed with georeferenced background base maps that provide a visual method for tracking the UAV and for performing collision avoidance.

3 Claims, 3 Drawing Sheets

GROUND-BASED SENSE-AND-AVOID DISPLAY SYSTEM (SAVDS) FOR UNMANNED AERIAL VEHICLES

The invention was made with Government support under cooperative agreement number NNA04CK24A awarded by NASAS. The Government has certain rights in the invention.

BACKGROUND OF THE INVENTION

1. Field of the Invention

The present invention relates to the field of unmanned aerial vehicles (UAVs). Specifically, the invention relates to a system that integrates real-time tracking radar data with the positional data of a UAV to identify collision threats. The name used for the innovation is SAVDS (Sense-and-Avoid Display System).

2. Description of the Prior Art

UAVs must share the National Airspace System (NAS) with piloted aircraft. The Federal Aviation Administration (FAA) is in the process of defining the requirement that UAVs must either see-and-avoid or sense-and-avoid other aircraft in the NAS to insure safety for UAV operations. The problem identified by the FAA is the challenge of effectively sensing conflicting aircraft when the UAV is out of visual range of the ground-based UAV pilot. UAV operations in the NAS currently require a Certificate of Authorization from the FAA, which is reviewed on a case-by-case basis. The certification process requires that ground-located UAV pilots verify that they can ensure avoidance of other air traffic in the area of operation to the satisfaction of the FAA review board. The lack of a standardized approach has previously limited low altitude UAV operations to line-of-sight activities that require dedicated sets of eyes to identify any potential airspace conflicts. This limitation has restricted most approved UAV operations to flight heights of less than 2,000 ft and distances of less than 1 mile. The prior art does not teach any ground-based system that meets the FAA-mandated sense-and-avoid requirement for low altitude UAV operations under 10,000 ft out of visual range.

In an effort to simulate the presence of a pilot in the cockpit, much of the prior art addressing the sense-and-avoid challenge has focused on trying to equip UAVs with forward-looking video feeds to represent the equivalent eyes of a pilot. Gimbaled video cameras can try to represent a pilot's perspective. However, unless the UAV is equipped with video feeds looking in all directions, such a technology is limited to sensing only those threats that are directly in the forward-looking field of view. Such a limited awareness does not adequately address the possibility of a conflict from any and all directions. The fact is that conflicts can come from any direction, most commonly from above and below.

SUMMARY OF THE INVENTION

The present invention is a Sense-and-Avoid Display System (SAVDS) that integrates position data (x,y,z) from a ground-based tracking radar with position data from the global positioning system (GPS) element of the UAV's flight management autopilot system.

Using a high-resolution display, the SAVDS shows the GPS position of the UAV in relation to other local aircraft detected using a portable ground-based tracking radar system. With the SAVDS co-located adjacent to the UAV Ground Control Station (GCS) controlling the UAV, the SAVDS provides UAV pilots with the requisite information needed to change the position of the UAV until any potential aircraft conflict is abated. This enabling technology directly addresses the current safety limitations because it provides UAV pilots with a grounded framework for initiating avoidance maneuvers in real-time without the limitations of a forward-looking video system, which has very limited resolution. In the preferred embodiment of the invention, ground-based radar data and the UAV GPS data are integrated and displayed with georeferenced base maps that provide a visual method for performing collision avoidance and also provide a means for tracking the UAV relative to geographic waypoints.

DETAILED DESCRIPTION OF THE INVENTION

Figure 1:
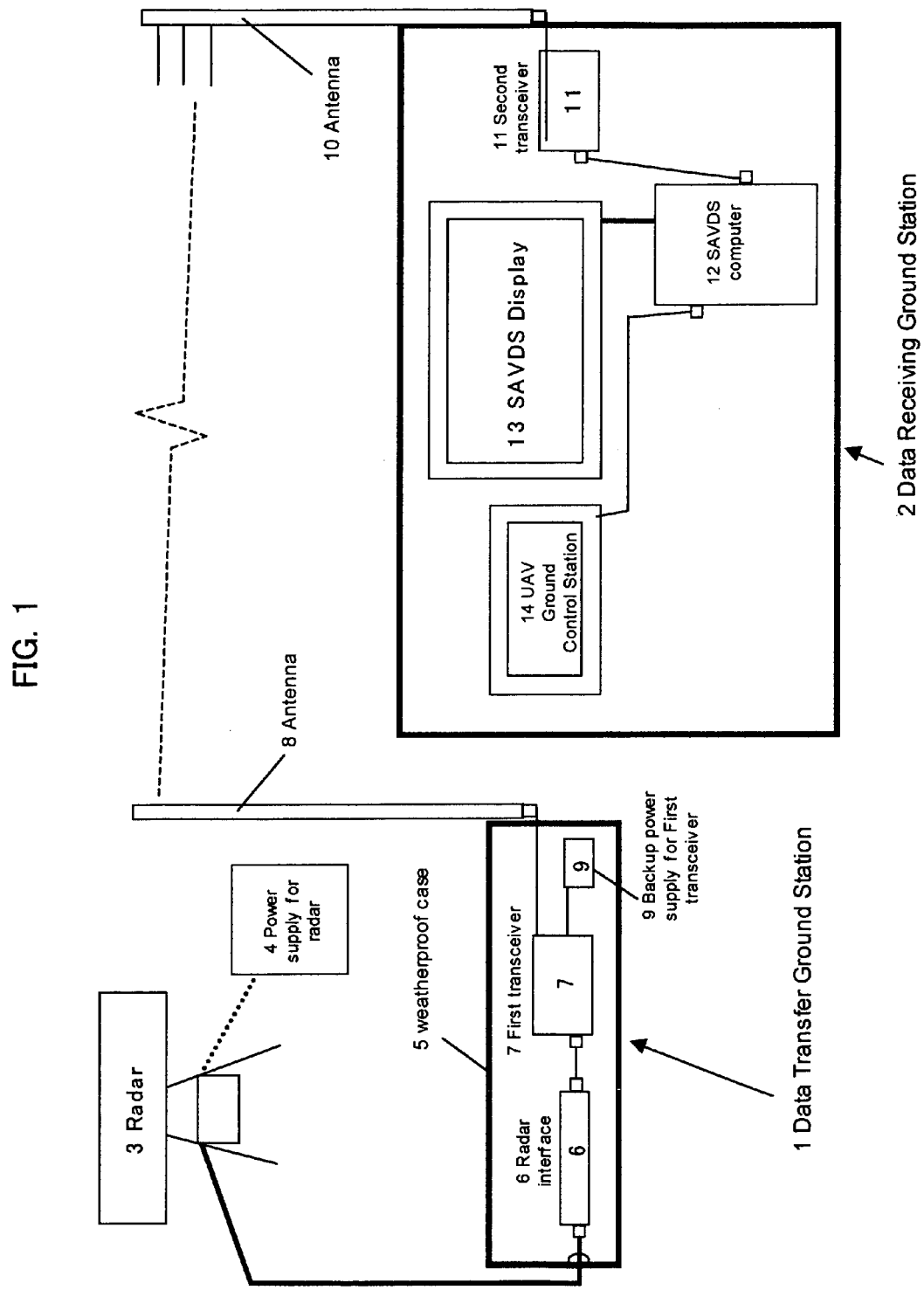
FIG. 1 shows a graphic representation of the SAVDS functional elements.

With reference to FIG. 1, the SAVDS system includes two functional subsystems: Data Transfer Ground Station (DTGS) 1 and Data Receiving Ground Station (DRGS) 2. DTGS 1 further comprises a ground-based radar 3, such as the Light and Special Divisions Interim Sensor (LSDIS/PSTAR) radar manufactured by Lockheed Martin. Radar 3 is connected to a primary electric power supply 4 that may comprise any portable generator or typical facility power common in the art. Output from radar 3 is routed into a weatherproof case 5. Within case 5, radar data is minimally conditioned by an element of the radar called the control indicator unit 6. Control indicator unit 6 may be powered by the same energy source as the radar 3. Control indicator unit 6 passes radar data to the first spread-spectrum radio transceiver 7 such as those made by FreeWave Technologies. First radio transceiver 7 emits the radar data via an omni-directional antenna 8 that can be mounted on the external side of case 5. A secondary power supply 9 within case 5 may provide power to control indicator unit 6 and first radio transceiver 7. Primary power supply 4 may also provide an alternate source of power for both the control indicator unit 6 and the first radio transceiver 7 components within case 5.

DRGS 2 may be co-located in the vicinity of DTGS 1. Alternatively, DRGS 2 may be as much as 50 miles away depending upon the transmission range of first radio transceiver 7. DRGS 2 further comprises a yagi antenna 10 that receives the radar data and feeds the corresponding second radio transceiver 11. The corresponding second radio transceiver 11 sends radar data to a portable computer 12 which simultaneously receives UAV GPS data from the UAV autopilot system that is part of the UAV GCS 14. The invented SAVDS software installed in computer 12 integrates and georeferences both data streams, and the resulting graphical information is provided graphically on display 13. In the preferred embodiment, computer 12 is a Macintosh G5 machine manufactured by the Apple Computer Corporation. Computer 12 operates with Operating System 10.0 or newer and is loaded with the Apple Computer Corporation's open source code called X11, which enables the execution of the invented SAVDS software.

Figure 2A:
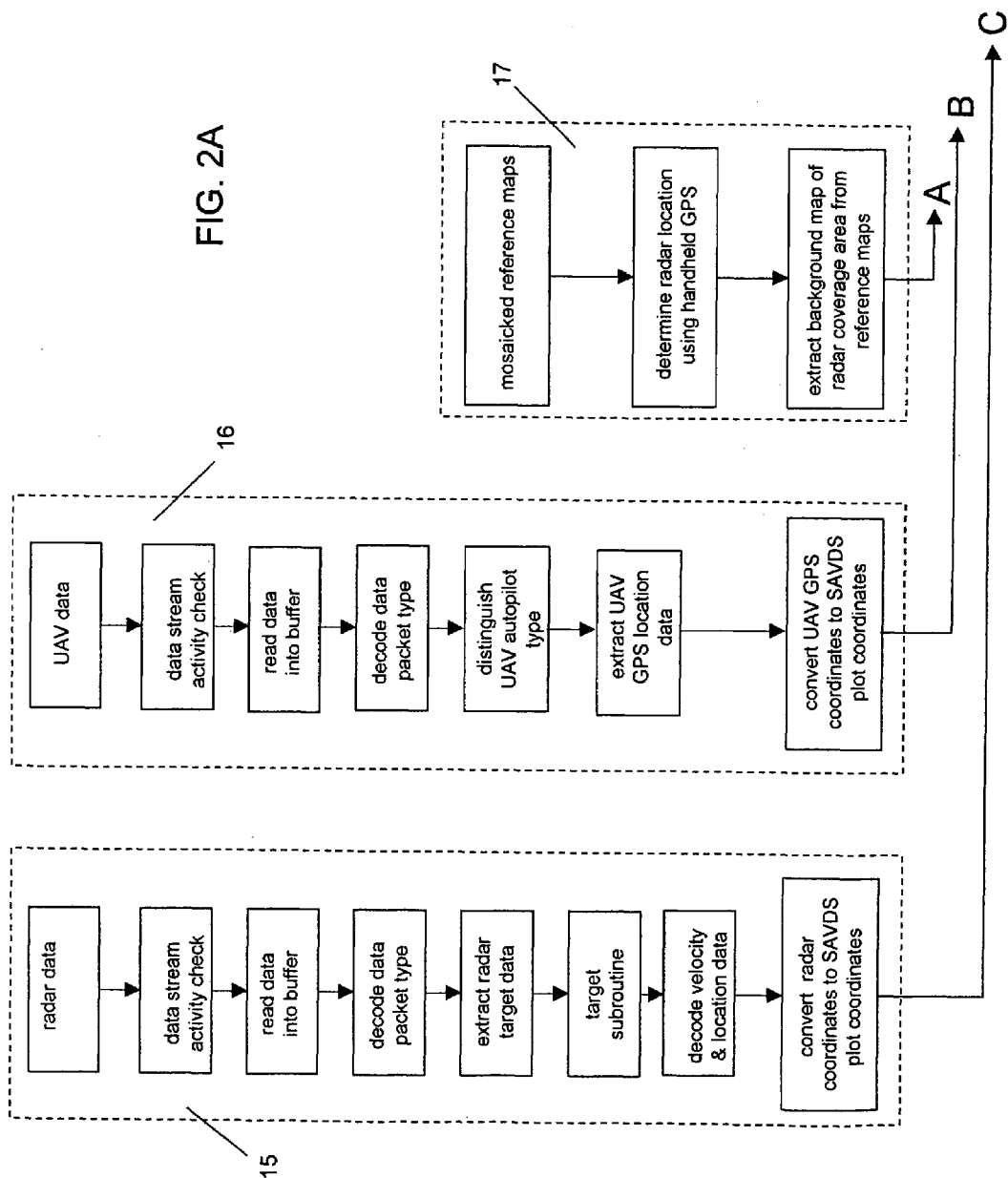
FIGS. 2A and 2B describe the data processing operations of the SAVDS.
Figure 2B:
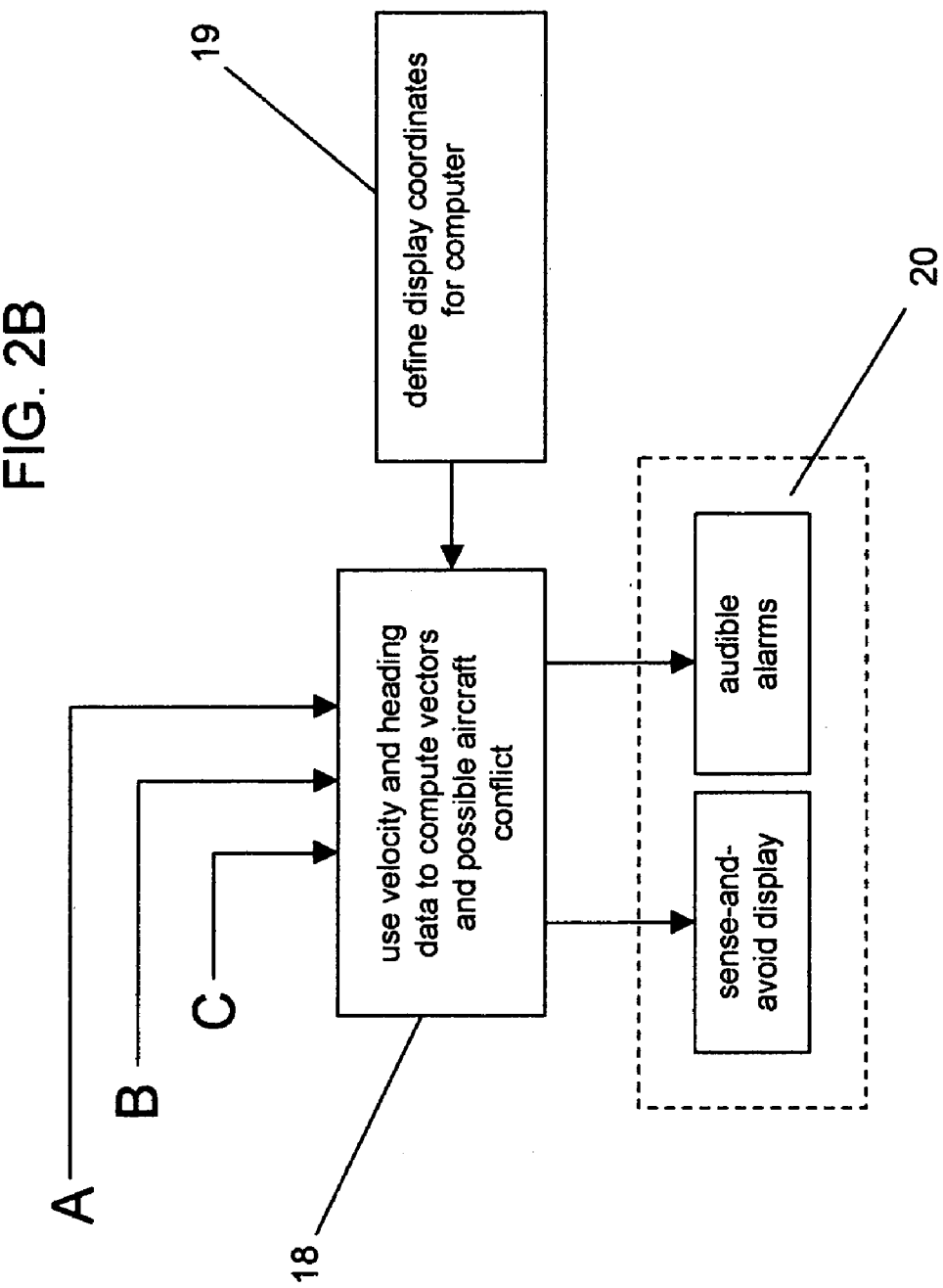

With reference to FIG. 2A, input data is broadly processed by three software routines: the radar data routine, the UAV data routine, and the geographical data routine. Radar data routine 15 begins with raw radar data ported into computer 12. The invented SAVDS software continuously checks for incoming radar data. Using the radar, data are received at typical sampling rates of approximately four seconds in real time. These data are read into a memory buffer in order to properly synchronize them with buffered data from UAV data routine 16. Next the buffered radar data packets are decoded. The typical radar data stream includes a significant amount of data that are unused by the SAVDS software. These unused data (such as radar identification number, port number, grade of data, rotorcraft identifier) are stripped out of the packets. The remaining data identifying specific targets are thus extracted. For each target, the SAVDS software executes a target subroutine that compares and correlates the most recent packet's position data with projections based on the previous packet's target position data and computed velocity vectors. SAVDS then updates the new position and velocity of each radar-detected airborne target (RDAT) and converts this data to a displayable coordinate system. This information is forwarded on to computational routine 18.

UAV data routine 15 begins with raw UAV data ported into computer 12. The SAVDS software continuously checks for incoming UAV data. Commercially available UAV autopilot control systems supply GPS data in real time. This data stream is read into a memory buffer in order to properly synchronize it with buffered data from radar data routine 15. Next the buffered UAV data packets are decoded and fed to the SAVDS software translator. The software translator is coded to extract the UAV's GPS position data. Several commercial UAV autopilot control systems are available. Translator modules have been written into the SAVDS software for selected UAV autopilot control systems. The appropriate translator corresponding to the UAV autopilot used for a UAV mission is selected automatically by the SAVDS software. The SAVDS software compares and correlates the most recent UAV position data with projections based on the previous known position and velocity vector. SAVDS then updates the new position and velocity, and converts the data to a displayable coordinate system. This information is forwarded on to computational routine 18.

Other aircraft do not pose the only threat to UAVs. Topographical features, such as mountains, are of critical importance to pilots of low-flying UAVs. Readily identifiable topographic surface features also may be of interest. Aerial observation of such surface features may indeed be the primary objective of some UAV flights. These surface features provide a means for tracking the UAV relative to geographic waypoints.

To aid in this surface recognition, SAVDS includes a powerful tool for correlating UAV position to topography and geographic locations. Topographical maps, such as those at 1:250,000 scale developed by the United States Geological Survey (USGS), have been carefully knitted together into seamless mosaicked composite maps. Similar mosaicked maps, based on USGS data at different scales or other georeferenced maps, can be readily loaded into the SAVDS software to provide coverage for other portions of North America or other localities in the world.

Georeferencing routine 17 provides the SAVDS software with this key reference map collection. A hand-held GPS locator is used to determine the position of the ground-based radar 3. This coordinate information is typed into the SAVDS software, which then extracts a background map of the radar coverage area from the mosaicked reference maps. Radar coverage area refers to the airspace within which the radar detects piloted aircraft and other airborne targets.

Computational routine 18 integrates position, velocity, and heading data from both radar data routine 15 and UAV data routine 16 to compute vectors for the UAV and for the RDAT(s). The resulting information is electronically overlaid on the background map provided by the georeferencing routine 17 and sent to interface routine 20. Interface routine 20 visually renders the results on display 13. Aircraft conflicts are identified graphically on the display 13. Interface routine 20 also issues an audible alarm.

While any comparable computer 12 and associated display 13 common in the art may be used to display SAVDS results, the preferred platform is the G5 model computer manufactured by Apple Computer Corporation of Cupertino, Calif. SAVDS information is optimized for use of Apple Computer Corporation's 23-inch liquid crystal display (LCD) linked with the G5 computer.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A ground-based sense and avoid display system for an unmanned aerial vehicle ("UAV") comprising:
    a data transfer station, comprising a ground-based radar and a first spread spectrum transceiver that receives radar data from the radar and transmits the radar data;
    a data receiving ground station comprising a second spread spectrum transceiver that receives the radar data from the first transceiver, a UAV ground control station ("GCS") comprising a UAV autopilot system that permits manual override, a display system for displaying at least one of a position (x,y,z) and a velocity vector for the UAV and for displaying at least one of a position and a velocity vector for at least one radar detected airborne target ("RDAT"), and a computer that is programmed:
    (i) to execute a radar data routine that receives and processes data from the ground-based radar, identifies at least one RDAT and estimates position coordinates and velocity for the at least one RDAT for at least first and second times of estimation;
    (ii) to execute a UAV computation routine that receives global positioning system ("GPS") position and velocity data for the UAV from the UAV GCS and estimates position coordinates for the UAV for the at least first and second estimation times;
    (iii) to execute an air traffic conflict routine that receives the estimated position and velocity coordinates for the at least one RDAT and for the UAV for the at least first and second times of the estimations, and determines if the UAV and the at least one RDAT will come within a selected threshold distance of each other within a selected time interval, determined with reference to the present time;
    (iv) to execute an air traffic warning routine that issues at least one of a visually perceptible signal and an audibly perceptible signal indicating that the UAV and the at least one RDAT will come within the selected threshold distance of each other within the selected time interval; and
    (v) to execute a georeferencing and interface routine that provides a geographical background map of a radar coverage area and that provides visually perceptible icons on the map representing the UAV position and the at least one RDAT position for at least one of the at least first and second estimation times.

2. The system of claim 1, wherein said computer is further programmed to remove irrelevant radar data, drawn from the group of said radar data received for said at least one RDAT and including at least one of radar identification number, port number, grade of said data or rotorcraft identifier, before or at the time said radar data routine is executed.

3. The system of claim 1, wherein said computer is further programmed to provide at least one of a visually perceptible estimation signal and an audibly perceptible estimation signal indicating an estimate of a time, if any, determined with reference to said present time, that said UAV and said at least one RDAT will first come within said selected threshold distance of each other within said selected time interval.

* * * * *